United States Patent
Perng et al.

(10) Patent No.: US 9,900,645 B1
(45) Date of Patent: Feb. 20, 2018

(54) METHODS AND SYSTEMS FOR EXECUTING FUNCTIONS ASSOCIATED WITH OBJECTS ON A TRANSPORTATION VEHICLE

(71) Applicant: Panasonic Avionics Corporation, Lake Forest, CA (US)

(72) Inventors: Chin Perng, Laguna Niguel, CA (US); Geethanjali Balasubramanian, Lake Forest, CA (US); Gurmukh Khabrani, Irvine, CA (US); Raymond Hackley Vincent, Jr., Costa Mesa, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 0 days.

(21) Appl. No.: 15/356,351

(22) Filed: Nov. 18, 2016

(51) Int. Cl.

| | | |
|---|---|---|
| *H04N 21/414* | (2011.01) | |
| *H04N 21/4363* | (2011.01) | |
| *H04N 21/436* | (2011.01) | |
| *H04N 21/482* | (2011.01) | |
| *H04N 21/262* | (2011.01) | |
| *H04N 21/8545* | (2011.01) | |
| *H04N 21/472* | (2011.01) | |
| *H04N 21/4223* | (2011.01) | |
| *H04W 68/08* | (2009.01) | |
| *H04W 88/08* | (2009.01) | |

(52) U.S. Cl.
CPC . *H04N 21/41422* (2013.01); *H04N 21/26258* (2013.01); *H04N 21/4223* (2013.01); *H04N 21/43615* (2013.01); *H04N 21/43637* (2013.01); *H04N 21/472* (2013.01); *H04N 21/482* (2013.01); *H04N 21/8545* (2013.01); *H04W 88/08* (2013.01)

(58) Field of Classification Search
CPC ....... H04N 21/41422; H04N 21/26258; H04N 21/4223; H04N 21/43615; H04N 21/43637; H04N 21/472; H04N 21/482; H04N 21/854
See application file for complete search history.

(56) References Cited

U.S. PATENT DOCUMENTS

| | | | |
|---|---|---|---|
| 8,856,838 B2 | 10/2014 | Keen et al. | |
| 2006/0012677 A1* | 1/2006 | Neven, Sr. ............. | G06K 9/228 348/61 |
| 2006/0079294 A1* | 4/2006 | Chen ................. | H04M 1/72522 455/566 |
| 2008/0004978 A1* | 1/2008 | Rothschild ............. | G06Q 30/00 705/26.8 |

(Continued)

OTHER PUBLICATIONS

"TensorFlow—an Open Source Software Library for Machine Intelligence", http://www.tensorflow.org, Nov. 9, 2016.

*Primary Examiner* — Nathan Flynn
*Assistant Examiner* — Alexander Q Huerta
(74) *Attorney, Agent, or Firm* — Brian Furrer (57) ABSTRACT

Methods and systems for a transportation vehicle are provided. One method includes interfacing a PED with an IFE system that includes a function associated with an object; capturing an image of an object by the PED, identifying the function associated with the object using the captured image and an application of the PED; presenting an option by the application to activate the function; and upon selection of the option by a user, communicating a request to IFE system to activate the function.

20 Claims, 9 Drawing Sheets

(56) References Cited

U.S. PATENT DOCUMENTS

| | | | |
|---|---|---|---|
| 2009/0079705 A1* | 3/2009 | Sizelove | B64D 11/0015 345/173 |
| 2009/0285443 A1* | 11/2009 | Camp, Jr. | G08C 17/02 382/100 |
| 2010/0284617 A1* | 11/2010 | Ritzau | G06K 9/228 382/181 |
| 2011/0162016 A1* | 6/2011 | Petrisor | H04N 7/18 725/77 |
| 2011/0170747 A1* | 7/2011 | Cohen | G06K 9/228 382/103 |
| 2011/0314507 A1* | 12/2011 | Keen | H04N 7/18 725/77 |
| 2013/0170710 A1* | 7/2013 | Kuoch | G06K 9/00624 382/104 |
| 2013/0293734 A1* | 11/2013 | Fan | G06K 9/2081 348/222.1 |
| 2013/0335611 A1* | 12/2013 | Roman | G06F 17/30247 348/333.01 |
| 2016/0364788 A1* | 12/2016 | Jo | G06Q 30/0635 |

\* cited by examiner

METHODS AND SYSTEMS FOR EXECUTING FUNCTIONS ASSOCIATED WITH OBJECTS ON A TRANSPORTATION VEHICLE

TECHNICAL FIELD

The present disclosure relates to identifying and executing a function or option on a transportation vehicle system associated with an object captured by a digital image.

BACKGROUND

Transportation vehicles, for example, aircraft, trains, buses, recreation vehicle, boats and other similar vehicles use various computing devices for providing various functions, including entertainment, system control, content storage, and other functions. These computing devices include hardware (for example, servers, switches, network interface cards, storage adapters, storage devices and others) and software (for example, server applications, operating systems, firmware, management applications, application programming interface (APIs) and others).

Transportation vehicles today may have individualized functional equipment dedicated to a particular passenger seat, which can be utilized by the passenger, such as adjustable seats, adjustable environmental controls, adjustable lighting, telephony systems, video and/or audio entertainment systems, crew communication systems, and the like. Many commercial airplanes today may also have individualized video and audio entertainment systems, often referred to as "inflight entertainment" or "IFE" systems. Such systems may also be referred to as "inflight entertainment and communication" systems as well, and typically abbreviated as "IFEC" systems.

As one example of a function that a passenger may activate, entertainment systems for passenger carrier vehicles, such as commercial airlines, often have video displays installed at each passenger seat. For instance, video displays may be provided at each passenger seat, such as mounted at each of the seats of the passenger seats, and/or on cabin walls and/or deployable from an armrest for seats located at a bulkhead, i.e., in the first row of a section. Many of these systems allow each passenger to select from multiple video channels and/or audio channels, or even individually select and play videos from a library of videos. These video displays may also provide access to games, communication applications (e.g., telephone service, messaging, etc.), Internet browsing, and other computer applications. Sometimes such displays are referred to as smart monitors due to the ability to provide computer applications and process and store data internally.

To operate the seat functions, such as an individualized audio/video system, controls are provided on or near the passenger seats that allow passengers to control various functions. The controls may be physical buttons, or on-screen interfaces displayed, for instance, on the video display of the entertainment system. For example, some commercial airplane entertainment systems have on-screen interfaces for controlling a reading light, activating a crew member call signal, as well as controlling audio/video entertainment.

It has become quite commonplace for travelers to carry personal electronic devices (PEDs) having wireless communication capability, such as cellular phones, smart phones, tablet computers, laptop computers, and other portable electronic devices. This includes passengers traveling on all types of transportation including vehicles of common carriers, such as airplanes, passenger trains, buses, cruise ships, sightseeing vehicles (e.g., ships, boats, buses, cars, etc.). Many of these personal electronic devices have the capability to execute application programs ("apps") to perform various functions, including controlling other devices and systems.

In conventional systems, a passenger of a transportation vehicle, for example, an aircraft, typically has to sort through printed materials or electronic displays to determine what may be available to watch, listen, buy, or request. The passenger may call a flight attendant for service or basic information and wait for the requested service. Continuous efforts are being made to develop innovative technology for improving passenger travel experience and providing tools to transportation carriers for meeting passenger needs.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

As a preliminary note, the terms "component", "module", "system", and the like as used herein are intended to refer to a computer-related entity, either software-executing general purpose processor, hardware, firmware or a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

In one aspect, innovative, computing technology has been developed that enables a passenger on a transportation vehicle, for example, an aircraft, to capture a single or a series of images of one or more objects, using an optical sensor/camera of a personal electronic device (PED). An application executed by the PED is able to present services/functions associated with the images. For example, a passenger can capture an image of a movie listing (for example, from a catalog or a seat device) and an option is presented to the passenger for adding the movie to a playlist for the specific passenger by the application.

In one aspect, the innovative computing technology enables passengers to access an inconvenient or hard to reach location. For example, when a passenger is sitting on their chair and want to turn on a reading light, the passenger may take an image of an overhead light (an object) and be able to turn on/off the reading light using the application, i.e., activate and deactivate a function associated with the object. The passenger may use the same technology for accessing a "call attendant" button by taking an image of the call button.

In another aspect, a typical feature rich application has many screens and buttons that users have to use to access individual features/functions. The innovative technology provided herein enable users to access individual features/functions by capturing an image of an object of interest. For example, by taking an image of a movie listing, the passenger may be able to obtain the elapsed time for a movie from an aircraft entertainment system, or other information.

In yet another aspect, the innovative technology provided herein enables a crew member to manage services and functions for passengers by capturing an image of an object of interest. For example, using the technology disclosed herein, a crew member is able to remotely control a window shade by taking an image of the window.

In yet another aspect, a user is able to take an image from a shopping catalog and initiate a transaction with a merchant site. It is noteworthy that the term user mentioned in this disclosure includes passengers, crew members and others.

In one aspect, a PED with a camera connects to an aircraft system/server via a Wi-Fi connection. The PED camera captures an image of an object of interest. The aircraft system maintains a recognition data structure (for example, in a relational database or other format) with information regarding recognizable images, e.g., movie posters, aircraft interior, shopping catalogs and others. The aircraft system also maintains text for onboard media, shopping catalogs and others. This may include movie titles, actor names, shopping item names and other metadata.

For image recognition, a processor executable application ("app") is executed by the PED. The app processes the captured images that are compared to information stored in the recognition data structure. If there is a match, then a related media identifier is used as a context for any related action. For text recognition, the captured text is processed by using OCR (optical character recognition). The captured text is compared to information stored in the recognition data structure. When a match occurs, the associated action or function is identified and executed.

Figure 1A:
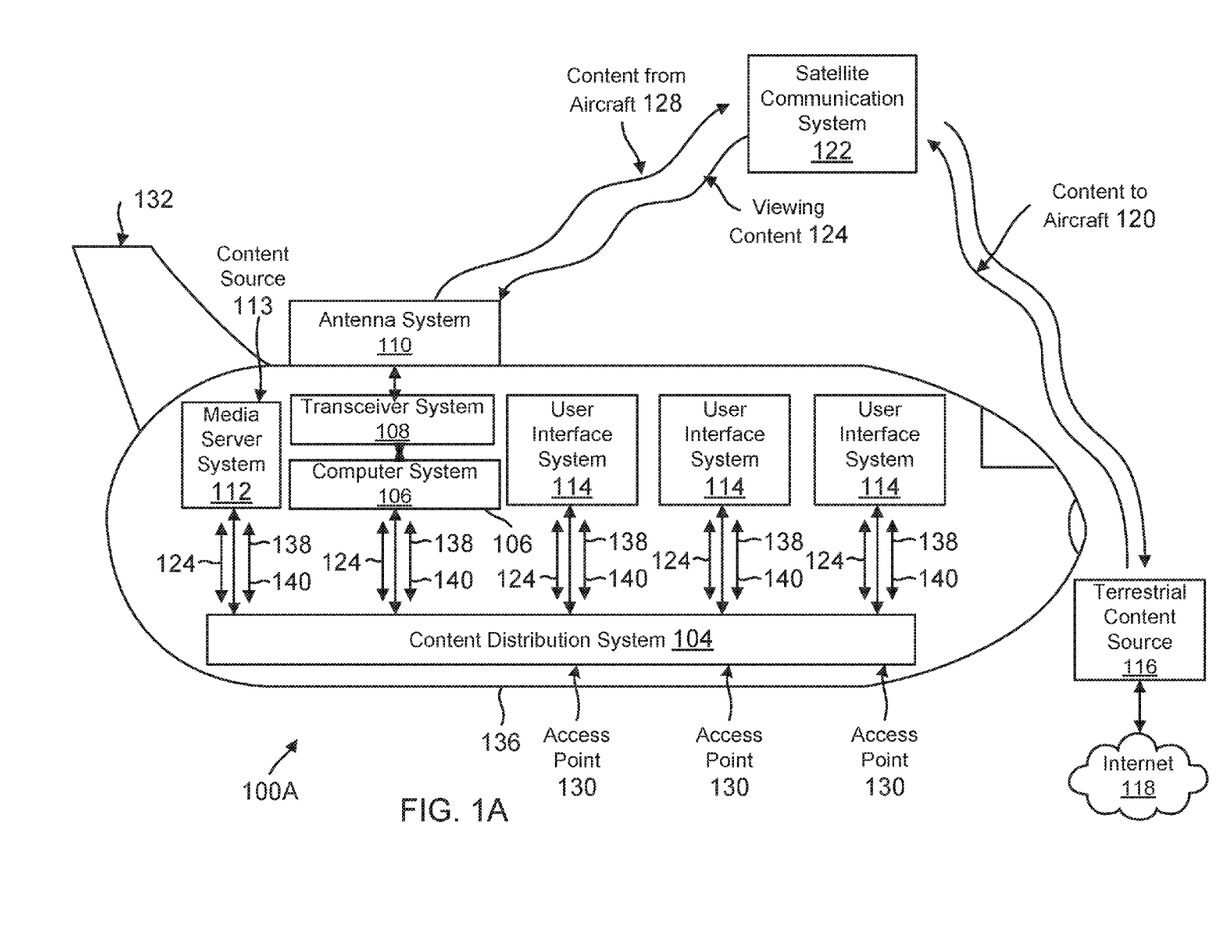
FIG. 1A shows an example of an operating environment for implementing the various aspects of the present disclosure on an aircraft.

Vehicle Information System:

FIG. 1A shows an example of a generic vehicle information system 100A (also referred to as system 100A) that can be configured for installation aboard an aircraft 132 for using innovative technology that enables a PED on the aircraft 132 to capture images and execute actions associated with the captured images, according to one aspect of the present disclosure. When installed on an aircraft, system 100A can comprise an aircraft passenger IFE system, such as the Series 2000, 3000, eFX, eX2, eXW, and/or any other inflight entertainment system developed and provided by Panasonic Avionics Corporation (without derogation of any trademark rights of Panasonic Avionics Corporation) of Lake Forest, Calif., the assignee of this application.

System 100A comprises at least one content source 113 and one or more user (or passenger) interface systems (may also be referred to as a seat device/seatback device) 114 that communicate with a real-time content distribution system 104. The content sources 113 may include one or more internal content sources, such as a media server system 112, that are installed aboard the aircraft 132, one or more remote (or terrestrial) content sources 116 that can be external from the aircraft 132, or a distributed content system.

The media server system 112 can be provided as an information system controller for providing overall system control functions for system 100A and/or for storing viewing content 124, including pre-programmed viewing content and/or content 120 downloaded to the aircraft, as desired. The viewing content 124 can include television programming content, music content, podcast content, photograph album content, audiobook content, and/or movie content without limitation. The viewing content 124 as shown and described herein are not exhaustive and are provided herein for purposes of illustration only and not for purposes of limitation.

The server system 112 can include, and/or communicate with, one or more conventional peripheral media storage systems (not shown), including optical media devices, such as a digital video disk (DVD) system or a compact disk (CD) system, and/or magnetic media systems, such as a video cassette recorder (VCR) system, a solid state drive (SSD) system, or a hard disk drive (HDD) system, of any suitable kind, for storing the preprogrammed content and/or the downloaded viewing content 120.

The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming, the viewing content likewise can include two-way communications, such as real-time access to the Internet 118 and/or telecommunications.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122. System 100A thereby can receive content 120 from a selected terrestrial content source 116 and/or transmit (upload) content 128, including navigation and other control instructions, to the terrestrial content source 116. As desired, the terrestrial content source 116 can be configured to communicate with other terrestrial content sources (not shown). The terrestrial content source 116 is shown as providing access to the Internet 118. Although shown and described as comprising the satellite communication system 122 for purposes of illustration, the communication system can comprise any conventional type of wireless communication system, such as a cellular communication system (not shown) and/or an Aircraft Ground Information System (AGIS) communication system (not shown).

To facilitate communications with the terrestrial content sources 116, system 100A may also include an antenna system 110 and a transceiver system 108 for receiving and viewing content from the remote (or terrestrial) content sources 116. The antenna system 110 preferably is disposed outside, such as an exterior surface of a fuselage 136 of the aircraft 132. The antenna system 110 can receive content 120 from the terrestrial content source 116 and provide the content 120, as processed by the transceiver system 108, to a computer system 106 of system 100A. The computer system 106 can provide the received content 120 to the media (or content) server system 112 and/or directly to one or more of the user interfaces 114 including a PED as viewing content 124, as desired. Although shown and described as being separate systems for purposes of illustration, the computer system 106 and the media server system 112 can be at least partially integrated.

The user interface system 114 may be computing terminals in communication with an access point 130. The user interface system 114 provides a display device to view content. In one aspect, the user interface system 114 includes a hardware interface to connect to an access point 130 that provides a wired and/or a wireless connection for the user interface system.

In one aspect, the user interface system 114 comprises a processor executable application that a user downloads and installs on a PED to receive and view content via an access point 130. While bandwidth limitation issues may occur in a wired system on a vehicle, such as an aircraft 132, in general the wired portion of the vehicle information 100A system is designed with sufficient bandwidth to support all users aboard the vehicle, i.e., passengers.

The user interface system 114 may also include an input system (not shown) for permitting the user (or passenger) to communicate with system 100A, such as via an exchange of control signals 138. For example, the input system can permit the user to enter one or more user instructions 140 for controlling the operation of system 100A. Illustrative user instructions 140 can include instructions for initiating communication with the content source 113, instructions for selecting viewing content 124 for presentation, and/or instructions for controlling the presentation of the selected viewing content 124. If a fee is required for accessing the viewing content 124, a Wi-Fi connection or for any other reason, payment information likewise can be entered via the input system. The input system can be provided in any conventional manner and typically includes a touch screen, one or more switches (or pushbuttons), such as a keyboard or a keypad, and/or a pointing device, such as a mouse, trackball, or stylus.

In one aspect, the user interface system 114 is provided at individual passenger seats of aircraft 132. The user interface system 114 can be adapted to different aircrafts and seating arrangements and the adaptive aspects described herein are not limited to any specific seat arrangements or user interface types.

Figure 1B:
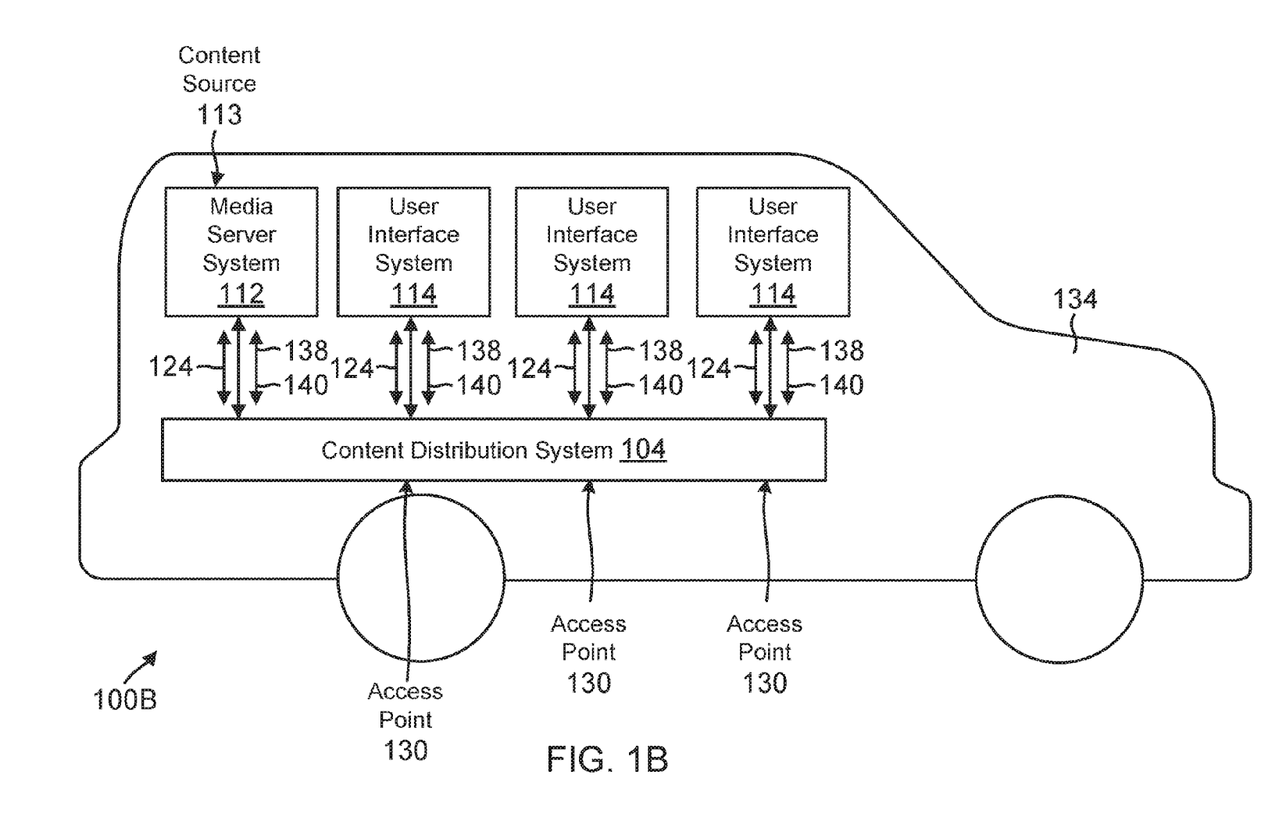
FIG. 1B shows an example of the operating environment on a non-aircraft transportation vehicle type, according to one aspect of the present disclosure.

FIG. 1B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be similar to the components of system 100A described above with respect to FIG. 1A and for brevity are not described again.

Figure 2:
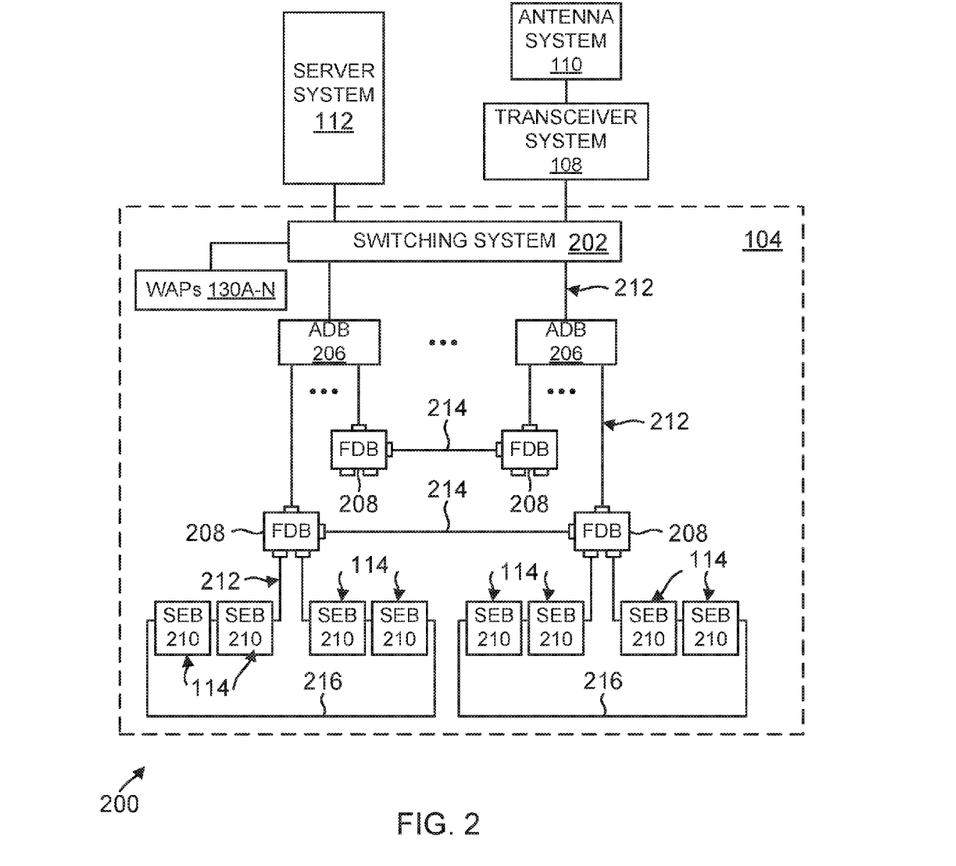
FIG. 2 shows an example of a content distribution system, used according to one aspect of the present disclosure.

Content Distribution System:

FIG. 2 illustrates an example of the content distribution system 104 for the vehicle information system 200 (similar to 100A/100B), according to one aspect of the present disclosure. The content distribution system 104 couples, and supports communication between the server system 112, and the plurality of user interface systems 114.

The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN) of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16. Preferably being configured to support high data transfer rates, the content distribution system 104 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As illustrated in FIG. 2, the distribution system 104 can be provided as a plurality of area distribution boxes (ADBs) 206, a plurality of floor disconnect boxes (FDBs) 208, and a plurality of seat electronics boxes (SEBs) (and/or video seat electronics boxes (VSEBs) and/or premium seat electronics boxes (PSEBs)) 210 being configured to communicate in real time via a plurality of wired and/or wireless communication connections 212. The distribution system 104 likewise can include a switching system 202 for providing an interface between the distribution system 104 and the server system 112. The switching system 202 can comprise a conventional switching system, such as an Ethernet switching system, and is configured to couple the server system 112 with the area distribution boxes 206. Each of the area distribution boxes 206 is coupled with, and communicates with, the switching system 202. In addition, the distribution system 104 includes one or more wireless access points (WAPs) (130A to 130N) connected in communication with the switch system 202 for wireless distribution of content to user interface systems 114 including PEDs.

Each of the area distribution boxes 202, in turn, is coupled with, and communicates with, at least one floor disconnect box 208. Although the area distribution boxes 206 and the associated floor disconnect boxes 208 can be coupled in any conventional configuration, the associated floor disconnect boxes 208 preferably are disposed in a star network topology about a central area distribution box 206 as illustrated in FIG. 2. Each floor disconnect box 208 is coupled with, and services, a plurality of daisy-chains of seat electronics boxes 210. The seat electronics boxes 210, in turn, are configured to communicate with the user interface systems 114. Each seat electronics box 210 can support one or more of the user interface systems 114.

The switching systems 202, the area distribution boxes 206, the floor disconnect boxes 208, the seat electronics boxes (and/or video seat electronics boxes (VSEBs) and/or premium seat electronics boxes (PSEBs)) 210, the antenna system 110, the transceiver system 108, the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

The distribution system 104 can include at least one FDB internal port bypass connection 214 and/or at least one SEB loopback connection 216. Each FDB internal port bypass connection 214 is a communication connection 212 that permits floor disconnect boxes 208 associated with different area distribution boxes 206 to directly communicate. Each SEB loopback connection 216 is a communication connection 212 that directly couples the last seat electronics box 210 in each daisy-chain of seat electronics boxes 210 for a selected floor disconnect box 208 as shown in FIG. 2. Each SEB loopback connection 216 therefore forms a loopback path among the daisy-chained seat electronics boxes 210 coupled with the relevant floor disconnect box 208.

It is noteworthy that the various aspects of the present disclosure may be implemented without using FDB 208. When FDB 208 is not used, ADB 206 communicates directly with SEB 210 and/or server system 112 may communicate directly with SEB 210 or the seats. The various aspects of the present disclosure are not limited to any specific network configuration.

Figure 3A:
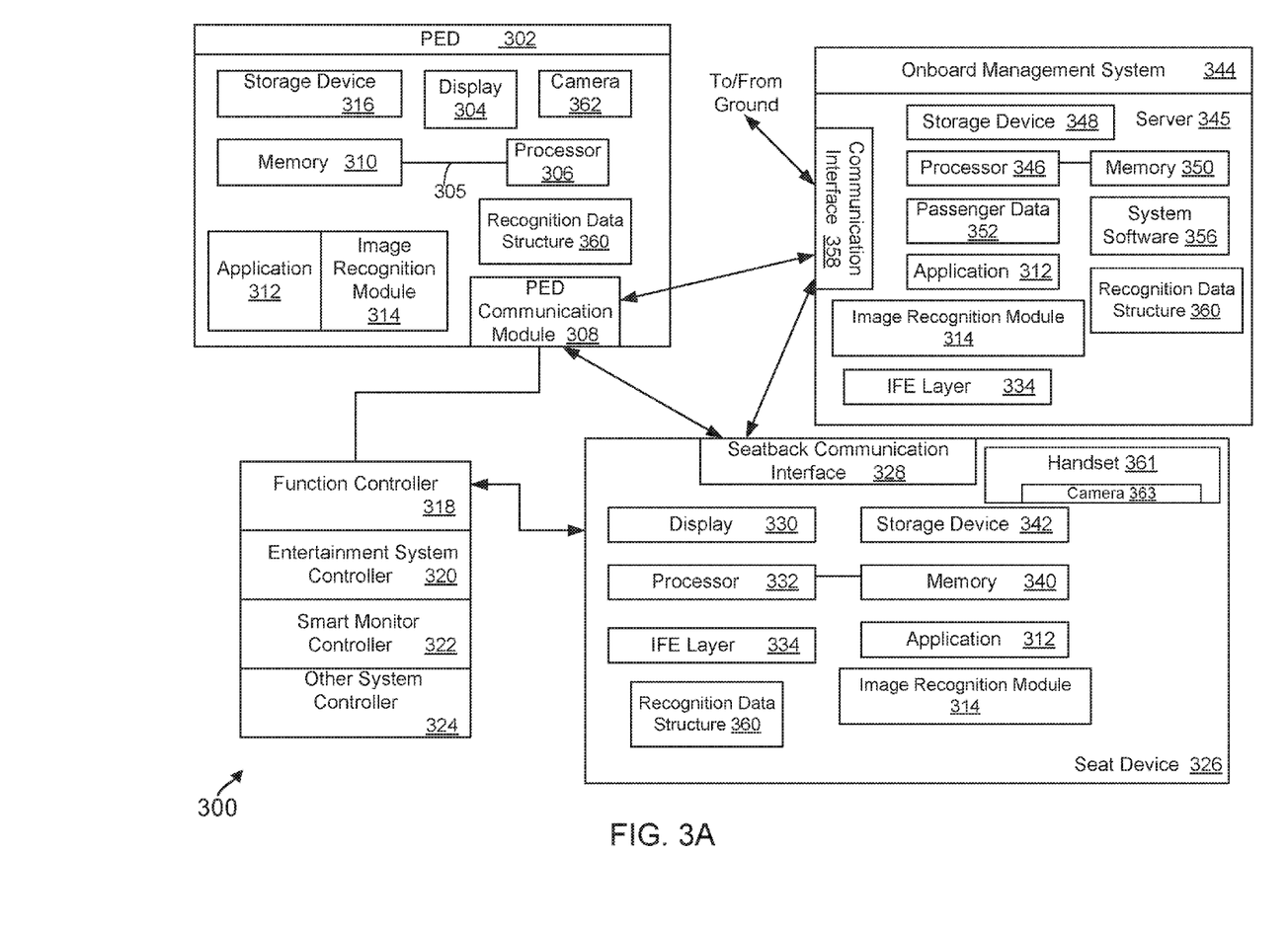
FIG. 3A shows an example of a system for capturing and processing images on a transportation vehicle, according to one aspect of the present disclosure.

Object Recognition System:

FIG. 3A shows an example of a system 300 using innovative computing technology for capturing object images on a transportation vehicle and then identifying and executing associated actions or functions with the captured images, according to one aspect of the present disclosure. System 300 includes a PED 302 that may be used with an onboard management system 344 for activating a function or requesting a service, in one aspect of the present disclosure. The PED 302 may be optionally paired or associated with a seat device (may also be referred to as seatback device) 326. The onboard management system 344 may be similar to computer system 106 and/or server 112 described above with respect to FIGS. 1A/1B. The seat device 326 may be part of the user interface system 114 or interfaces with the user interface system 114 described above with respect to FIGS. 1A/1B. It is noteworthy that the seat device 326 need not be mounted on the back of a seat and may be supported from other structures, such as a bulkhead, wall, arm of a seat, etc. The adaptive aspects of the present disclosure are not limited to any specific type, location or orientation of the seat device 326.

In one aspect, the PED 302 may be a mobile phone, a notebook, a tablet, a laptop or any other similar device. PED 302 may include a processor 306 that has access to a memory 310 via an interconnect/bus 305 for executing stored instructions. Processor 302 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. The bus system 305 is an abstraction that represents any one or more separate physical buses and/or point-to-point connections, connected by appropriate bridges, adapters and/or controllers. The bus system 305, therefore, may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

PED 302 includes a storage device 316 that may be, or may include any storage medium for storing data in a non-volatile manner, such as one or more magnetic or optical based disks, flash memory, or solid-state drive. The storage device 316 may be used to store a recognition data structure 360 that is used to identify an action associated with a captured image of an object. Details of using the recognition data structure 360 are provided below.

The storage device 316 may also store content that is displayed on a display 304 of PED 302 and other information. In one aspect, display 304 may also include a touch screen for receiving input commands.

The storage device 316 may further store pairing data that includes pairing information for securely pairing the PED 302 with the seat device 326 or any other aircraft system. The term "pair", and other grammatical forms such as "pairing", means that the PED 302 is associated with a particular passenger seat such that communications received by seat device 326 from the PED 302 are recognized as being related to that passenger seat and/or such communications control functions associated with the particular passenger seat and controlled by a function controller 318. The term automatic as associated with pairing means that the PED is paired with minimal passenger involvement. In one aspect, the pairing data includes PED 302 identification information, and/or configuration information that is used to pair the PED 302 including a seat identifier.

The storage device 316 may also store an application (may be referred to as a companion application) 312 and executed out of memory 310. In one aspect, application 312 enables the PED 302 to automatically pair with a transportation vehicle system in general and to the seat device 326 in particular, with minimal passenger involvement.

Application 312 includes or interfaces with an image recognition module 314 that uses the recognition data structure 360 to enable the PED 302 to identify an action associated with an image captured by a PED camera 362 (may also be referred to as an optical sensor). PED camera 362 takes digital images that are provided to the image processing module 314. As an example, processor executable code for image recognition module 314 may be obtained from tensorflow.org, vuforia.com, or other sources. Details regarding image recognition module 314 are provided below.

In one aspect, application 312 including the image recognition module 314 may be stored on a storage device of an application store ("App Store") (not shown) such as that operated by Apple, Inc. under the trademark ITUNES, the application store operated by Google, Inc. under the trademark GOOGLE PLAY, or the application store operated by Microsoft Corporation under the trademark WINDOWS STORE, without derogation of any third party trademark rights. Alternatively, the app store may be a website server for a website operated by a provider of the on-board management system 344 such as the manufacturer or a carrier operating the vehicle (e.g., a commercial airline, train operator, cruise line, bus line, etc.).

It is noteworthy that application 312/image recognition module 314 may be executed in a distributed environment, for example, partly by seat device 326 and/or the onboard management system 344. The adaptive aspects described herein are not limited to any specific location for executing application 312 and/or the image recognition module 314.

In one aspect, the function controller 318 provides a controller 320 to control the entertainment system for accessing audio/video content, and a controller 322 for controlling a seatback monitor (that is part of or interfaces with the seat device 326). Some entertainment systems, do not include seatback monitors, and audio/video content is streamed by the onboard management system 344 to the PED 302, if requested by a passenger on these systems.

Other system controller 324 may include a controller for controlling the lighting system for controlling lights for a passenger seat, e.g., a reading light, a controller for an attendant call system to call an attendant, a controller for a telephone system, a controller for food service to order food, a controller for making seat adjustments and others. The various aspects disclosed herein are not limited to any particular type of function. The function controller 318 may be triggered based on an image captured by camera 362, as described below in detail.

In one aspect, the function controller 318 communicates with the PED communication module 308 that includes one or more interfaces to communicate with different devices, including a Wi-Fi interface, Bluetooth interface, NFC (Near Field Communication) interface and others. The adaptive aspects described herein are not limited to any specific interface. It is noteworthy that although a single block is shown for the PED communication module 308 for convenience, the communication module 308 may have different interface, cards, logic and circuitry to comply with the different communication protocols/standards.

In one aspect, the seat device 326 includes a display device or simply "display" 330, a processor 332, a memory 340, a communication interface 328 and a local storage device 342 for storing content. The seat device 326 receives user input/requests via an input module (not shown). The input module may be configured to use a local touch screen proximate or integrated with display 330, a local virtual keyboard, an external mouse, external keyboard or any other input device. The various adaptive aspects described herein are not limited to any specific input device. Moreover, as described earlier, some entertainment systems do not provide seatback displays, in which case the seat device 326 does not include a display 300 and content is streamed to the PED 302 for consumption by a passenger.

Processor 332 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

In one aspect, processor 336 executes an IFE layer (may also be referred to as IFE controller) 334 that provides inflight entertainment and other options to users. The IFE layer 334 uses the communication interface 328 to interface with the PED 302 and/or onboard management system 344. The IFE layer 334 provides audio/video content as well as controls for accessing the content. In one aspect, the seat device 326 may also execute the image recognition module 314 and use the recognition data structure 360, as described below in detail.

In one aspect, the onboard management system 344 includes a server 345 (similar to media server 112 and/or computer system 106). The server 345 includes a processor 346 that has access to a memory 350 via a bus system, similar to bus 305 described above in detail.

Processor 346 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Processor 346 has access to a storage device 348 that may be used to store data, applications, structured or unstructured data and program files including the recognition data structure 360, application 312, system software 356, image recognition module 314 and/or the IFE layer 334.

In one aspect, the onboard management system 344 maintains passenger data 352 that identifies each passenger for a flight, a seat assigned to a passenger and any other information that can uniquely identify the passenger. The passenger data 352 may be populated from an electronic boarding pass that is used by a passenger and/or from the carrier operating the aircraft. The information from passenger data 352 may be provided to seat device 326 for validating passenger information to pair PED 302.

System software 356 of the onboard management system 344 is executed by the processor 346 to control the overall operation of the server 345.

In one aspect, server 345 communicates with PED 302 and/or seat device 326 via a communication interface 358. The communication interface 358 may also be used to receive information from the ground. The communication interface 358 includes one or more interfaces for a wired and/or wireless connection, as described above with respect to FIGS. 1A/1B and 2.

In one aspect, server 345 stores the image recognition module 314 and recognition data structure 360. The image recognition module 314 may be provided to the PED 302. The recognition data structure 360 or a portion thereof, may also be provided to the PED 302 for identifying actions, functions, and/or services associated with images and texts captured by the PED 302, as described below in more detail.

Figure 3B:
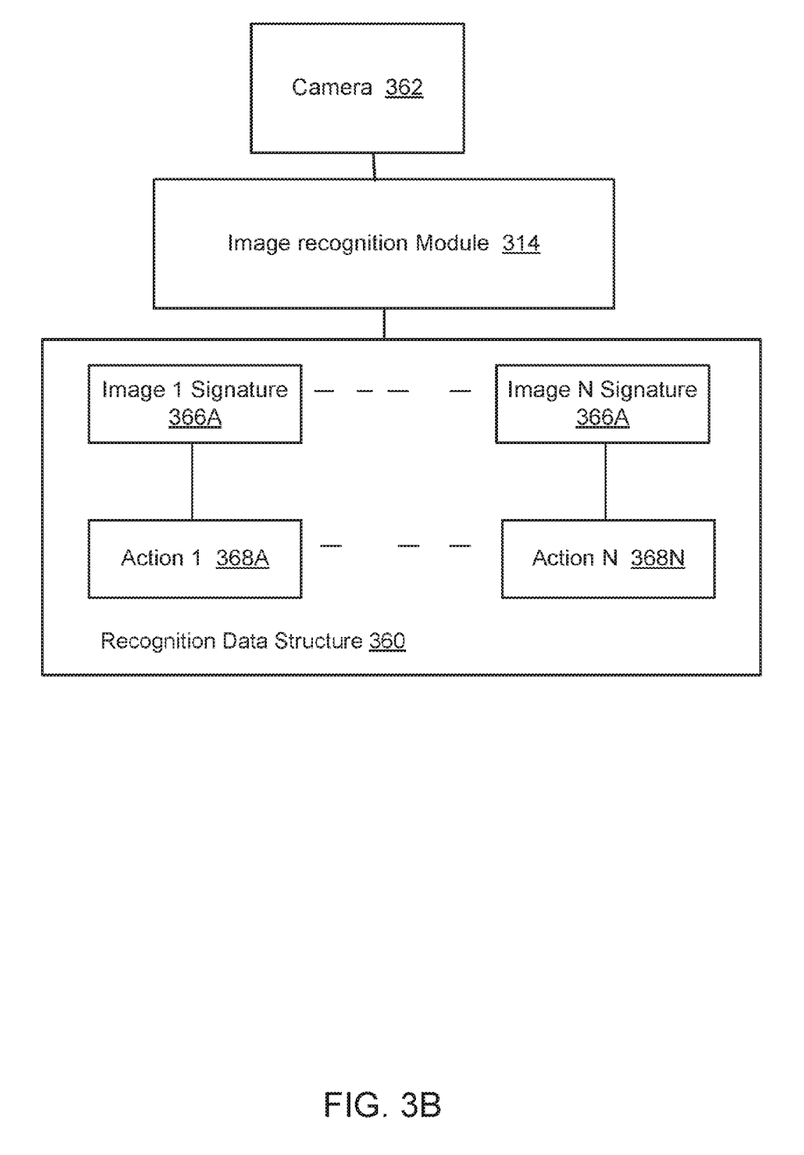
FIG. 3B shows an example of a recognition data structure used for object recognition, according to one aspect of the present disclosure.

FIG. 3B shows an example of the recognition data structure 360, in one aspect of the present disclosure. The camera 362 captures an image of an object (not shown) from one or more sources (not shown). The image is provided to the image recognition module 314 that accesses the recognition data structure 360 to identify an action associated with the object image.

The recognition data structure 360 stores image signatures 366A-366N with associated actions 368A-368N. The term image signature is intended to include text data as well. In one aspect, for an image, the signature includes edge, contrast and metadata information. The metadata information is used to define image attributes. As an example, metadata for video files may include a media identifier (MID), language identifier (LID), a title, a short title, name of the director, name of cast members, the year of release, genre, description, a short version of the description, a trailer MID, review, country of origin, a consumer review score, critic review score. For audio files, the metadata may include a media identifier (MID), language identifier (LID), a title, a short title, artist name, genre, description, a short version of the description, critic review score, year of release and copyright information. For computer implemented games, the metadata may include a media identifier (MID), language identifier (LID), a title, a short title, genre, description, a short version of the description, number of players and critic scores.

It is noteworthy that the various metadata fields mentioned above are simply examples and are not intended to narrow the various aspects of the present disclosure.

Figure 4A:
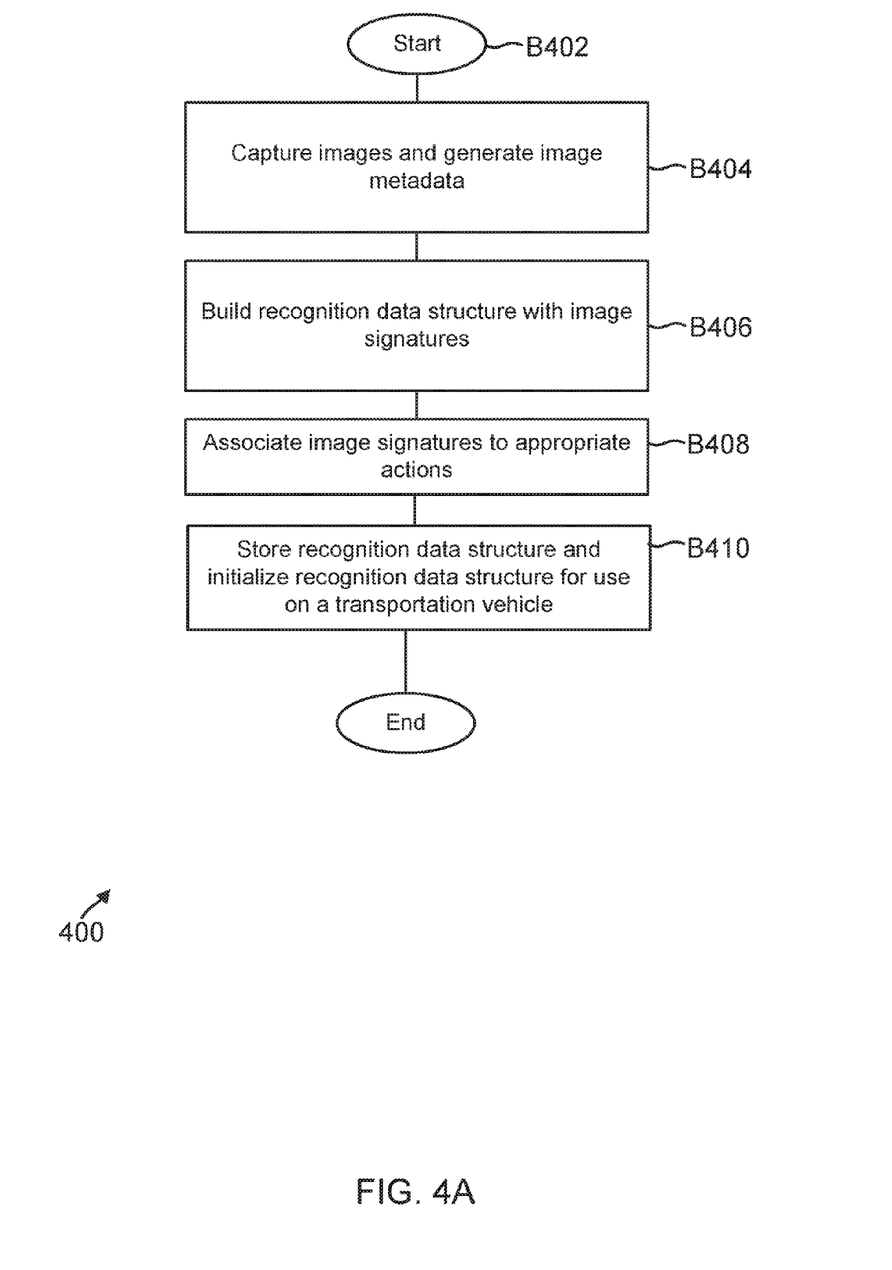
FIG. 4A shows a process flow for configuring a recognition data structure, according to one aspect of the present disclosure.

Process Flow:

FIG. 4A shows a process 400 for configuring the recognition data structure 360, according to one aspect of the present disclosure. Although the description below is based on an aircraft, the innovative technology disclosed herein may be used on other vehicles, for example, trains, buses, ships, recreational vehicles and others.

The process begins in block B402, when a computing system is initialized and operational to execute the process blocks of FIG. 4. In block B404, various digital images are captured via a camera. The images may be of various objects, including media posters, shopping catalogs that are presented in print on paper (hardcopy) or electronically on a flight, pictures of overhead panels and others. The images include text associated with objects or may only include text. The metadata for the captured images is also generated. As mentioned above, images are described by metadata that may vary based on content type.

In block B406, the recognition data structure 360 is generated. An image signature is derived for each image based on edge, contrast and metadata information.

In block B408, one or more actions, functions, and/or services are associated with each image signature (for example, 368A-368N, FIG. 3B). The actions provide passengers with options to execute associated functions and/or view related information.

In block B410, the recognition data structure 360 is stored in a storage device. In one aspect, the recognition data structure 360 is stored on storage device 348 and made available to an authorized PED 302 and/or seat device 326.

It is noteworthy that the recognition data structure 360 is dynamic in nature and changes as media content for the aircraft is updated. The recognition data structure 360 may be updated before an aircraft is airborne or during flight via a satellite connection. The adaptive aspects described herein are not limited to any specific updating technique.

Figure 4B:
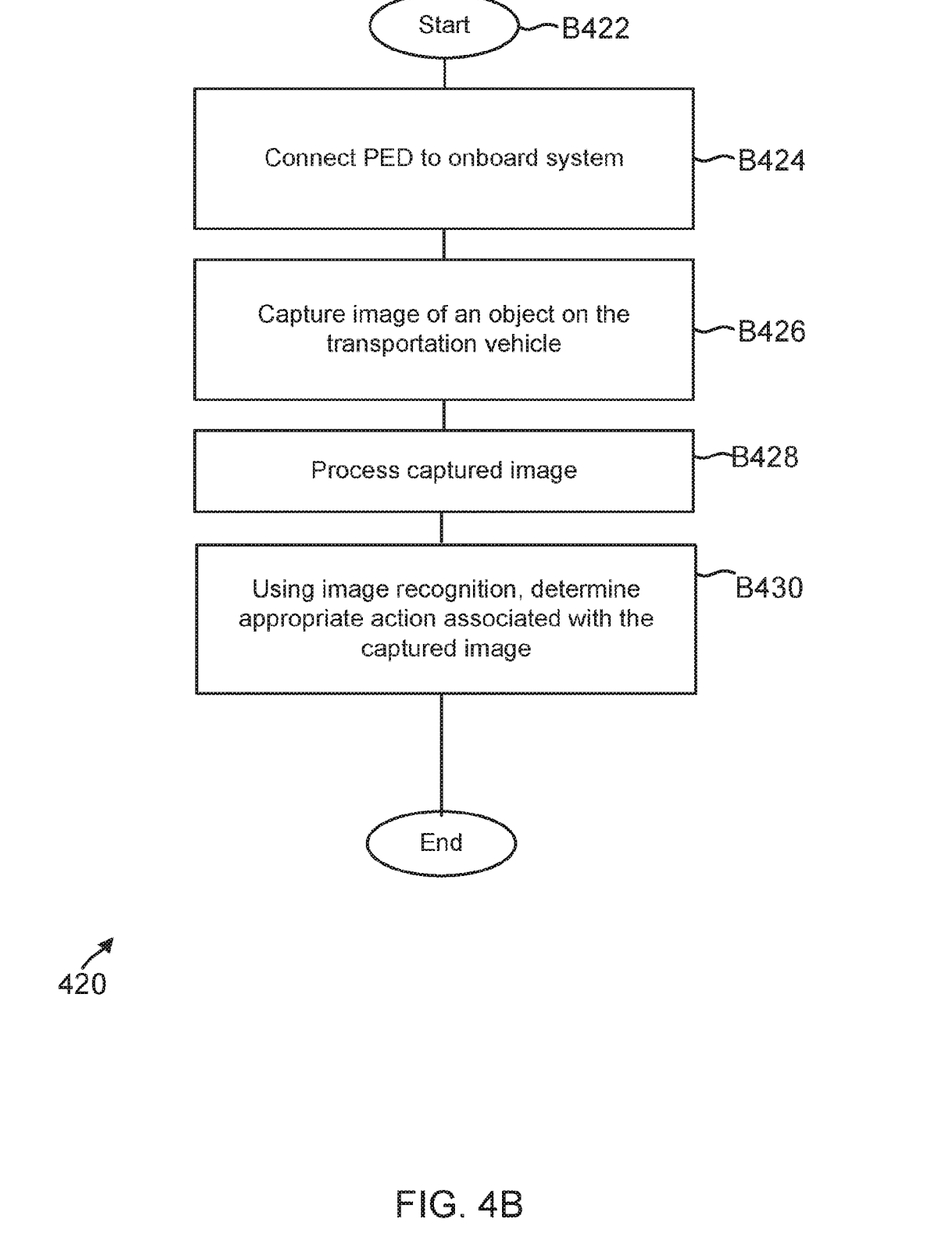
FIG. 4B shows a process flow for using the recognition data structure, according to one aspect of the present disclosure.

FIG. 4B shows a process 420 for using the recognition data structure 360, according to one aspect of the present disclosure. The process begins in block B422, when the recognition data structure 360 has been populated and initialized on an aircraft and/or PED 302.

In block B424, PED 302 connects to an onboard system, for example, server 345 (or seat device 326) via a Wi-Fi connection. The Wi-Fi connection may be enabled by WAP 130.

In block B426, camera 362 of PED 302 captures an image of an object. The image may include text or may just be text. In another aspect, the image may be provided to PED 302 from any other source.

The captured image is provided to the image processing module 314 that extracts metadata for the image in block B428. If the image only has text, then OCR is performed to identify the text. Once the image metadata is obtained, an image signature is generated.

In block B430, the image recognition module 314 uses the recognition data structure 360 to identify an action that may be associated with the captured image. If there is a match, then the associated action is presented for selection or execution. The action type would depend on the image type. For example, if the passenger captured an image of a movie listing, then an option to add the movie to the passenger's playlist may be presented to the passenger, and thereafter added, if the passenger selects the option for adding the movie, i.e., selects "yes." If the image is for a function corresponding to a seat location, for example, activating or deactivating a reading light at a seat, then the function controller 318 presents an option for the passenger to activate or deactivate the reading light. It is noteworthy that the process blocks of FIG. 4B may be executed by a crew member or any other user. The process then ends.

Figure 4C:
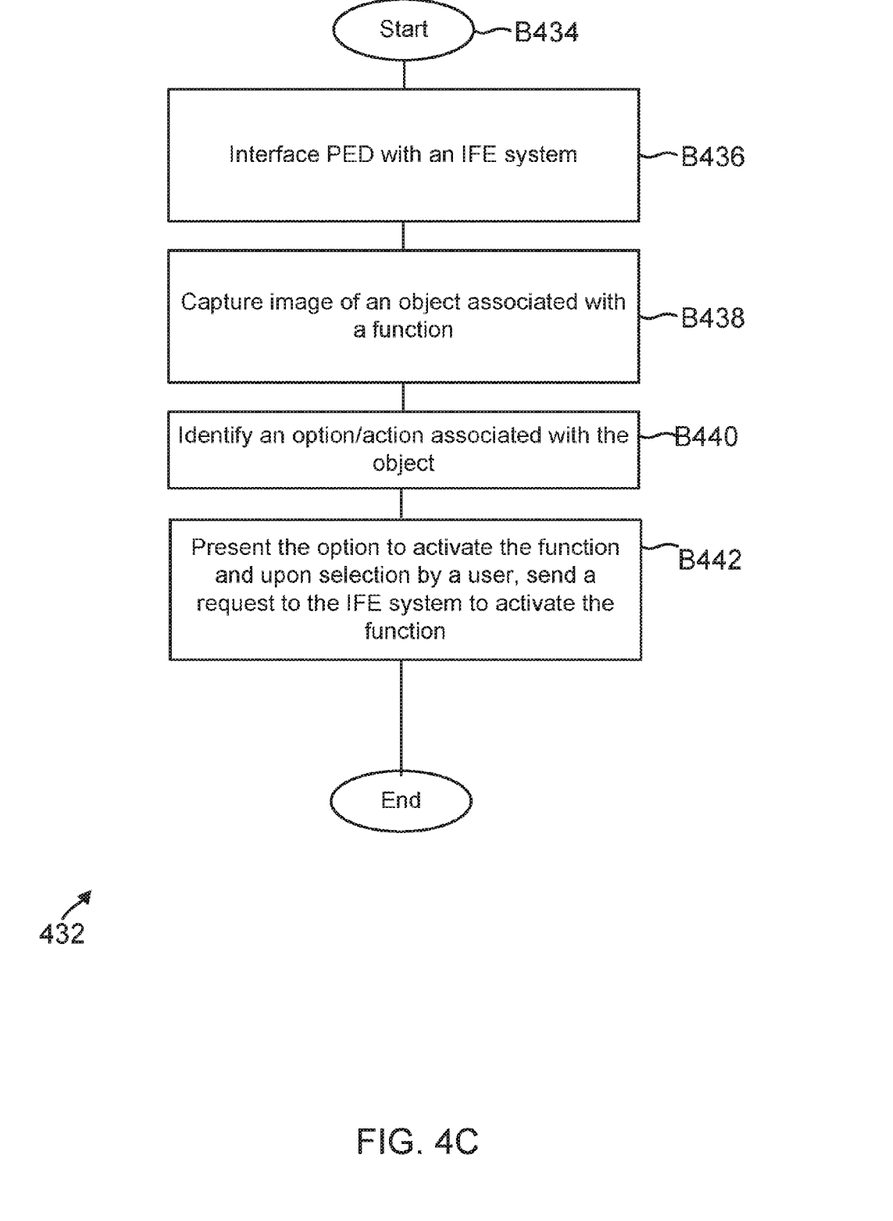
FIG. 4C shows a process flow for activating a function associated with an object defined by an image, according to one aspect of the present disclosure.

FIG. 4C shows another process 432 for using the innovative technology of this disclosure, according to yet another aspect. The process begins in block B434 when the recognition data structure 360 has been configured and stored. The data structure 360 is made accessible to PED 302 by server 345 or any other authorized source.

In block B436, the PED 302 interfaces with the IFE layer (or system) 334. The PED 302 may be paired with the IFE system 334 that includes a function associated with each seat.

In block B438, the PED camera 362 captures an image of an object that is associated with the function. The image is captured using an optical sensor.

In block B440, the image recognition module 314 using the recognition data structure 360 and the captured image, identifies an option associated with the object.

In block B442, the option is presented to a user to activate the function. The option may be presented by application 312 on display 304. Upon selection of the option by the user, a request is sent to the IFE system to activate the function. The user in this instance may be a passenger, a crew member or any other personnel. Thereafter, the process ends.

In one aspect, a PED 302 for use with an IFE system of an aircraft is provided. The IFE system includes a function associated with an object, and an IFE controller, which activates the function in response to a request. The PED includes a PED optical sensor to capture an image of an object; and a processor executable application (314) interfaces with the PED optical sensor to recognize an object associated with the function, present an option to activate the seat function, and upon selection of the option by a user, communicate a request to IFE system to activate the seat function.

As an example, the object may include printed material on paper (hardcopy) or electronic format displaying images of media available on the aircraft for user consumption, and the application recognizes media from the images and presents an option for the passenger to add the media to a playlist. In another example, the object may include a reading light, and the application recognizes the reading light from image data captured by the PED optical sensor when directed at the reading light, and presents an option for the user to activate the reading light.

In another example, the object may be of safety equipment provided aboard the vehicle, for instance, a life vest, in which the application recognizes the life vest, and thereafter presents an option for viewing instructional images for use of the vest. Another example is an object that serves as an exit sign. The application recognizes the object as an exit sign and presents an option on the PED display for viewing information about the exit marked by the sign. Yet another example is for online shopping. The object may be printed material displaying images of products for sale in a catalog in hardcopy or electronic format, and upon recognition of a product, renders a rotatable view of the product for viewing by the user of the PED. Still another example, is requesting services from crew. For example, a passenger may capture an image of a beverage or a food item, whereupon the application recognizes the object in the image as a service item, and presents an option for selection for delivery of the item to the passenger by a crew member. This may include requests for an item such as a blanket or reading mask, and advantageously makes it convenient to request items when the passenger and crew do not speak a common language.

In yet another aspect, a system for an aircraft is provided. The system includes an IFE system including an information processing system associating at least one function with an object, and a wireless access point in communication with the information processing system. The system also includes at least one PED having a PED optical sensor, a PED wireless transceiver which communicates with the wireless access point, a processor executable application executed by the PED operates the PED optical sensor to recognize an object associated with the function, present an option to activate the function, and upon selection of the option by the user, communicate a request to IFE system via the wireless access point to activate the function. The system further includes processor executable logic executed by the IFE information processing system to activate the function after receipt of the request.

In yet another aspect, a method is provided. The method includes interfacing a PED with an IFE system that includes a function associated with an object; capturing an image of an object by the PED, identifying the function associated the object; presenting an option by the application to activate the function; and upon selection of the option by the user, communicating a request to IFE system to activate the function.

Activation of some functions rely upon association with a seat. For example, in presenting an option for requesting a beverage, food item, or blanket, the application may ask the passenger to input a seat number. Alternatively, the passenger may have already paired or associated the PED 302 with a seat so that seat location information is already available to the PED. Other functions do not require a seat location, such as requesting streaming of content to the PED, adding a media selection to the PED playlist, or online shopping for delivery of items to a passenger's residence.

While the foregoing description has been directed to object recognition using a PED 302 and a camera 362 thereof, the description is applicable to handsets 361 of seat devices 326 that include a camera 363. In particular, a passenger could use a handset 361 and its camera 363 to capture an image or description of media in a catalog or magazine and add the media to a playlist for the seat device 326 connected to the handset 361. Some aircraft include smart monitors having cameras. The application could be provided on the smart monitor and the camera thereof used for object recognition as described earlier. For example, a passenger could hold a catalog page of media in front of the camera, whereupon the application would identify a media listing or image, and present an option to the passenger on the display 300 of the set device 326 to add the media to the passenger's playlist. As described earlier, the object may be of a beverage or food item that the application identifies based upon an image thereof from its camera, and thereafter presents an option for the passenger to request delivery of the item.

Figure 5:
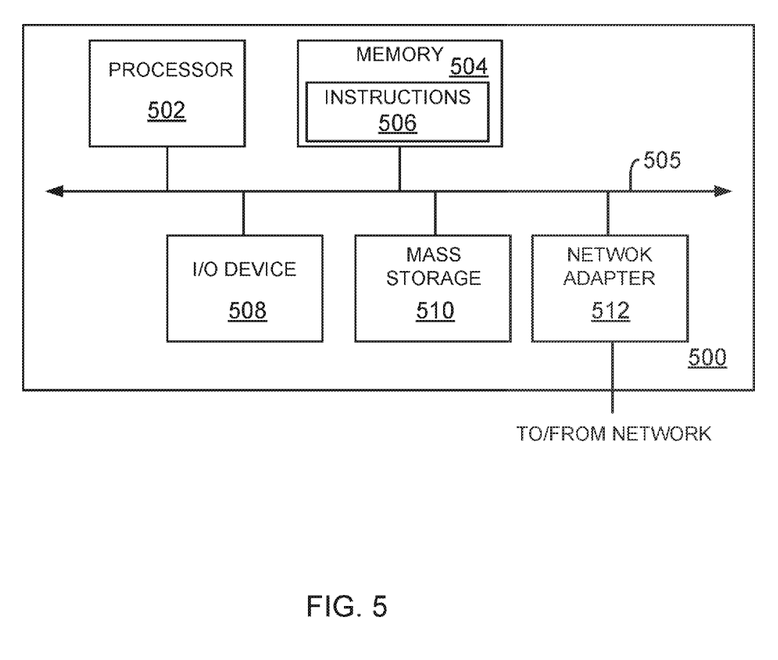
FIG. 5 shows a block diagram of a computing system, used according to one aspect of the present disclosure.

Processing System:

FIG. 5 is a high-level block diagram showing an example of the architecture of a processing system 500 that may be used according to one aspect. The processing system 500 can represent media server 112, computing system 106, WAP 130, onboard management system 344, seat device 326 or any user device (PED 302) that attempts to interface with a vehicle computing device. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 may be used to implement the process steps of FIGS. 4A-4C described above and store the recognition data structure 360 as well as the image recognition module 314.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks, flash memory, or solid-state drive.

The network adapter 512 provides the processing system 500 with the ability to communicate with remote devices (e.g., over a network and may be, for example, an Ethernet adapter or the like.

The processing system 500 also includes one or more input/output (I/O) devices 508 coupled to the bus system 505. The I/O devices 508 may include, for example, a display device, a keyboard, a mouse, etc. The I/O device may be in the form of a handset having one or more of the foregoing components, such as a display with a real or virtual keyboard, buttons, and/or other touch-sensitive surfaces.

Thus, methods and systems for processing images and executing functions associated with the images at a transportation vehicle have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A personal electronic device (PED) interfacing with an in-flight entertainment (IFE) system of an aircraft, the IFE system including a function associated with an object, and an IFE controller which activates the function in response to a request, the PED comprising:
   a PED optical sensor to capture an image of an object; and
   a processor executable application interfacing with the PED optical sensor to recognize the object associated with the function, present an option to activate the function, and upon selection of the option by a user, communicate a request to the IFE system to activate the function; wherein the object comprises at least one of printed material and electronic material displaying images of media available on the aircraft for user consumption, and the application recognizes media from the images and presents an option for the user to add the media to a playlist.

2. The personal electronic device of claim 1, wherein a wireless access point interfaces with the IFE system and a PED wireless transceiver.

3. The personal electronic device of claim 2, wherein the application communicates the request to the IFE system via the wireless access point.

4. The personal electronic device of claim 1, wherein the application uses a recognition data structure for identifying at least one of a function and option associated with the object.

5. The personal electronic device of claim 4, wherein the recognition data structure is stored by the IFE system and made available to the PED.

6. A personal electronic device (PED) interfacing with an in-flight entertainment (IFE) system of an aircraft, the IFE system including a function associated with an object, and an IFE controller which activates the function in response to a request, the PED comprising:
   a PED optical sensor to capture an image of an object; and
   a processor executable application interfacing with the PED optical sensor to recognize the object associated with the function, present an option to activate the function, and upon selection of the option by a user, communicate a request to the IFE system to activate the function; wherein the object comprises a reading light, and the application recognizes the reading light from image data captured by the PED optical sensor, and presents an option for the user to activate the reading light.

7. The personal electronic device of claim 6, wherein the application uses a recognition data structure for identifying at least one of a function and option associated with the object and the recognition data structure is stored by the IFE system and made available to the PED.

8. A system for an aircraft, comprising:
   an in-flight entertainment (IFE) system including an information processing system associating at least one function associated with an object, and a wireless access point in communication with the information processing system;
   at least one personal electronic device (PED) having a PED optical sensor, a PED wireless transceiver which communicates with the wireless access point, a processor executable application executed by the PED that operates the PED optical sensor to recognize the object associated with the function, present an option to activate the function, and upon selection of the option by a user, communicate a request to IFE system via the wireless access point to activate the function; and
   processor executable logic executed by the IFE information processing system to activate the function after receipt of the request; wherein the object comprises at least one of printed material and electronic material displaying images of media available on the aircraft for user consumption, and the application recognizes media from the images and presents an option for the user to add the media to a playlist.

9. The system of claim 8, wherein the application uses a recognition data structure for identifying the function associated with a captured image.

10. The system of claim 9, wherein the recognition data structure is stored by the IFE system and made available to the PED.

11. A system for an aircraft, comprising:
   an in-flight entertainment (IFE) system including an information processing system associating at least one function associated with an object, and a wireless access point in communication with the information processing system;
   at least one personal electronic device (PED) having a PED optical sensor, a PED wireless transceiver which communicates with the wireless access point, a processor executable application executed by the PED that operates the PED optical sensor to recognize the object associated with the function, present an option to activate the function, and upon selection of the option by a user, communicate a request to IFE system via the wireless access point to activate the function; and
   processor executable logic executed by the IFE information processing system to activate the function after receipt of the request; wherein the object comprises a reading light, and the application recognizes the reading light from image data captured by the PED optical sensor, and presents an option for the user to activate the reading light.

12. The system of claim 11, wherein the application uses a recognition data structure for identifying at least one of a function and option associated with the object and the recognition data structure is stored by the IFE system and made available to the PED.

13. A method comprising:
   interfacing a personal electronic device (PED) with an in-flight entertainment (IFE) system of an aircraft, the IFE system including a function associated with an object;
   capturing an image of an object by the PED, in which the object is associated with the function;
   identifying the function associated with the object using the captured image by an application executed by the PED;
   presenting an option by the application to activate the function; and
   upon selection of the option by a user, communicating a request to IFE system to activate the function; wherein the object comprises printed material displaying images of media available on the aircraft for user consumption, and the application recognizes media from the images and presents an option for the user to add the media to a playlist.

14. The method of claim 13, wherein a wireless access point interfaces with the IFE system and a PED wireless transceiver.

15. The method of claim 14, wherein the application communicates the request to the IFE system via the wireless access point.

16. The method of claim 13, wherein the application uses a recognition data structure for identifying the option associated with the object.

17. The method of claim 16, wherein the recognition data structure is stored by the IFE system and made available to the PED.

18. The method of claim 13, wherein the image is captured by a PED camera.

19. A method comprising:
   interfacing a personal electronic device (PED) with an in-flight entertainment (IFE) system of an aircraft, the IFE system including a function associated with an object;
   capturing an image of an object by the PED, in which the object is associated with the function;
   identifying the function associated with the object using the captured image by an application executed by the PED;
   presenting an option by the application to activate the function; and
   upon selection of the option by a user, communicating a request to IFE system to activate the function; wherein the object comprises a reading light, and the application recognizes the reading light from the image captured by the PED, and presents an option for the user to activate the reading light.

20. The method of claim 19, wherein the application uses a recognition data structure for identifying at least one of a function and option associated with the object and the recognition data structure is stored by the IFE system and made available to the PED.

* * * * *